(12) United States Patent
Marschand

(10) Patent No.: US 6,921,223 B2
(45) Date of Patent: Jul. 26, 2005

(54) COMBO PEN

(75) Inventor: Bret R. Marschand, Glendale Heights, IL (US)

(73) Assignee: Sanford, L.P., Freeport, IL (US)

( * ) Notice: Subject to any disclaimer, the term of this patent is extended or adjusted under 35 U.S.C. 154(b) by 77 days.

(21) Appl. No.: 10/663,610

(22) Filed: Sep. 15, 2003

(65) Prior Publication Data

US 2005/0058497 A1    Mar. 17, 2005

(51) Int. Cl.[7] ............................................. B43K 29/05
(52) U.S. Cl. ........................... 401/17; 401/18; 401/21; 401/34; 401/195
(58) Field of Search ............................. 401/17–21, 34, 401/52, 195

(56) References Cited

U.S. PATENT DOCUMENTS

| 62,227 A | 2/1867 | Ryne |
| 155,008 A | 9/1874 | Collard |
| 540,673 A | 6/1895 | Leonard |
| 555,752 A | 3/1896 | Bacho |
| 1,104,514 A | 7/1914 | Kilstrom |
| 1,524,657 A | 2/1925 | Keeran |
| 1,895,130 A | 1/1933 | Keeran |
| 1,923,153 A | 8/1933 | Lang |
| 1,932,371 A | 10/1933 | Keeran |
| 1,946,085 A | 2/1934 | Lungren |
| 2,146,609 A | 2/1939 | Welsh |
| 2,239,526 A | 4/1941 | Juelss |
| 2,266,429 A | 12/1941 | Lopez |
| 2,367,683 A | 1/1945 | Lopez |
| 2,481,803 A | 9/1949 | Weaver |
| 2,690,735 A | 10/1954 | Lopez |
| 3,765,780 A * | 10/1973 | Guu et al. ..................... 401/17 |
| 3,941,488 A | 3/1976 | Maxwell |
| 4,167,350 A | 9/1979 | Harris |
| 4,228,028 A | 10/1980 | Lin |
| D266,258 S | 9/1982 | Lockwood et al. |
| D266,259 S | 9/1982 | Tucker et al. |
| 4,386,866 A | 6/1983 | Graham et al. |
| 4,406,555 A | 9/1983 | Tsai |
| 4,511,273 A | 4/1985 | Trotta |
| 4,557,618 A | 12/1985 | Iwata et al. |
| 4,572,691 A | 2/1986 | Kirchhoff et al. |
| 4,600,327 A | 7/1986 | Guzman |
| 4,812,071 A | 3/1989 | Batra et al. |
| 4,895,467 A | 1/1990 | Kageyama et al. |
| 4,917,521 A | 4/1990 | Lai |
| 4,923,317 A | 5/1990 | Bishop et al. |
| 4,979,840 A | 12/1990 | Madaus et al. |
| D314,793 S | 2/1991 | Lockwood et al. |
| 5,022,772 A | 6/1991 | Kageyama et al. |

(Continued)

Primary Examiner—Gregory L. Huson
Assistant Examiner—Peter T deVore
(74) Attorney, Agent, or Firm—Marshall, Gerstein & Borun LLP

(57) ABSTRACT

A writing instrument having a substantially tubular body including a first and second end and a writing tip associated with the first end. The writing instrument includes a receptacle integrally formed within the second end and having a retaining portion to engage a removable auxiliary module including a securing portion, the removable auxiliary module adapted to be secured within the receptacle by the cooperation of the retaining portion and the securing portion. The writing instrument further includes an auxiliary module cap adapted to engage both the second end adjacent to the retaining and securing portions and the first end adjacent to the writing tip.

19 Claims, 5 Drawing Sheets

U.S. PATENT DOCUMENTS

| | | |
|---|---|---|
| D319,469 S | 8/1991 | Rutter |
| 5,056,949 A | 10/1991 | Petrillo |
| D324,072 S | 2/1992 | von Elder et al. |
| D324,397 S | 3/1992 | von Elder et al. |
| D325,398 S | 4/1992 | von Elder et al. |
| 5,123,766 A | 6/1992 | Babiak |
| 5,261,755 A | 11/1993 | Draper et al. |
| 5,310,437 A | 5/1994 | Tucker |
| D349,129 S | 7/1994 | Linderson et al. |
| 5,338,123 A | 8/1994 | Obersteller et al. |
| 5,393,368 A | 2/1995 | Stevens |
| D360,433 S | 7/1995 | Payne et al. |
| D362,019 S | 9/1995 | Linderson |
| D363,309 S | 10/1995 | Carpani et al. |
| D368,930 S | 4/1996 | Payne |
| 5,518,330 A | 5/1996 | Gervais et al. |
| 5,564,850 A | 10/1996 | Nagaoka |
| 5,662,424 A | 9/1997 | Shuhei et al. |
| 5,714,035 A | 2/1998 | Stevens |
| 5,746,529 A | 5/1998 | Peters et al. |
| D396,729 S | 8/1998 | Ham |
| 5,792,263 A | 8/1998 | Koyama et al. |
| 5,820,728 A | 10/1998 | Stevens et al. |
| D400,579 S | 11/1998 | Ham |
| D400,589 S | 11/1998 | Ham |
| 5,829,903 A | 11/1998 | Collins |
| 5,855,442 A | 1/1999 | Keller |
| D406,114 S | 2/1999 | Ham et al. |
| 5,915,872 A | 6/1999 | Machida et al. |
| 5,955,719 A | 9/1999 | Southworth et al. |
| 5,957,602 A | 9/1999 | Rosenthal |
| D416,043 S | 11/1999 | Arthur et al. |
| 6,004,057 A | 12/1999 | Fulop |
| 6,039,484 A | 3/2000 | Kageyama et al. |
| D428,918 S | 8/2000 | Mittersinker |
| 6,112,796 A | 9/2000 | Stevens |
| 6,146,038 A | 11/2000 | Mittersinker et al. |
| 6,179,501 B1 | 1/2001 | Fulop |
| D439,613 S | 3/2001 | Ham |
| 6,273,582 B1 | 8/2001 | Taggart et al. |
| 6,309,129 B1 | 10/2001 | Kageyama et al. |
| 6,345,922 B2 | 2/2002 | Tani |
| 6,461,068 B1 | 10/2002 | Holmes |
| 6,491,464 B1 | 12/2002 | Young |
| 6,554,516 B1 | 4/2003 | Christopher |
| 2002/0089553 A1 | 7/2002 | Arruda et al. |
| 2002/0159817 A1 | 10/2002 | Brand et al. |
| 2003/0049068 A1 | 3/2003 | Yasunga |

\* cited by examiner

COMBO PEN

TECHNICAL FIELD

The disclosed device generally relates to writing instruments, and more particularly to writing instruments adapted to receive a modular dispensing capsule.

BACKGROUND

Writing instruments such as ink pens, markers, highlighters and correction pens are well known in the art and are typically designed and optimized for a specific application or task. However, as the pace of work and life has increased it is rare that a person is able to focus or concentrate on any particular task for an extended length of time. As a result, people are often required to carry multiple writing instruments such as a pen, a highlighter, and a correction fluid dispenser to insure quick access to the appropriate instrument when needed.

U.S. Pat. No. 6,461,068 discloses a writing instrument that includes a first end portion from which characters may be dispensed, such as an inkpen tip, and a second end portion comprising a correction tape dispensing means. The writing instrument is adapted to allow a writer who makes an error using ink to conveniently invert the writing instrument from an initial position having the inkpen in contact with the paper being written upon, to a second position in which the correction tape dispensing means is in contact with the paper. Such a 180 degree change in the position of the writing instrument is all that is needed to render the writer able to apply a sufficient portion of correction tape to an error in the process for its correction.

U.S. Pat. No. 4,167,350 discloses a writing instrument including a marking element removably mounted in a casing and held in the casing by resilient means acting lengthwise of the writing instrument. Furthermore, a removable plug positioned at one end of the casing holds the removable marking element under compression in the casing.

While these known systems provide additional functionality, they do not provide the flexibility to customize their capabilities based on the situation. It would be desirable to have a customizable writing instrument capable of being configured with a wide range of writing, marking and correcting elements depending on the persons needs.

SUMMARY

A writing instrument having a substantially tubular body including a first and second end and a writing tip associated with the first end. The writing instrument includes a receptacle integrally formed within the second end and having a retaining portion to engage a removable auxiliary module including a securing portion, the removable auxiliary module adapted to be secured within the receptacle by the cooperation of the retaining portion and the securing portion. The writing instrument further includes an auxiliary module cap adapted to engage both the second end adjacent to the retaining and securing portions and the first end adjacent to the writing tip.

BRIEF DESCRIPTION OF THE DRAWINGS

Objects, features, and advantages of the present device will become apparent upon reading the following description in conjunction with the drawing figures, in which.

DETAILED DESCRIPTION

Figure 1:
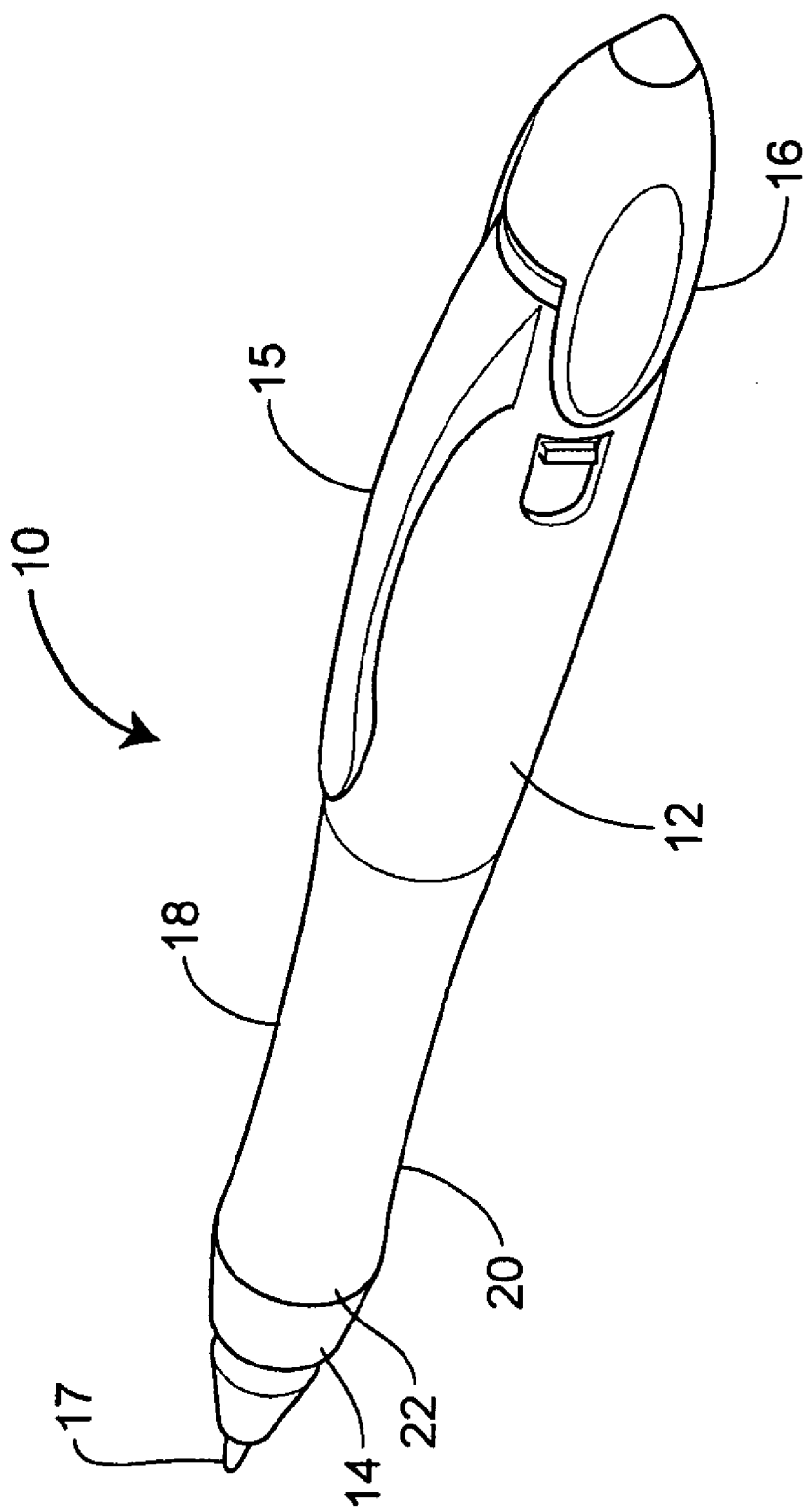
FIG. 1 illustrates a perspective view of an exemplary combination pen.

FIG. 1 illustrates a modular or combination writing instrument 10 constructed in accordance with the teachings of the present invention. The modular or combination writing instrument 10 can generally be any substantially cylindrical or tubular body 12 having a first end 14, a second end 16, and a clip 15 affixed adjacent to the second end 16. The first end 14 can include a writing tip 17 such as a mechanical pencil, a ballpoint pen, a roller ball pen, and a fountain pen. As indicated by arrow 19, the writing tip 17 may be deployed from a stored position to a writing position (shown) by twisting the body first end 14 around the axial centerline CL with respect to the body second end 16. It will be understood that the writing tip 17 may be deployed in a variety of known ways, such as mechanical plunger mechanism or, if desired, may be fixed in the writing position which would simplify the overall design and construction of the combination writing instrument 10.

FIG. 1 further illustrates a grip 18 positioned adjacent to the first end 14 and the writing tip 17. The grip 18 can be integrally formed into the tubular body 12 so that it is ergonomically designed to fit between the index finger and the thumb of the intended user. Specifically, the ergonomic design may result in the grip 18 having a roughly triangular cross-section, or varying diameters to form a narrow region 20 and a bulging region 22 adjacent to the first end 12. Furthermore, the grip 18 can be a separate component manufactured from a variety of resilient materials such as, for example, rubber. Another resilient material known as PLASMIUM™ may be used to allow the grip 18 to flow and morph so that it conforms to the shape of the user's hand.

Figure 2:
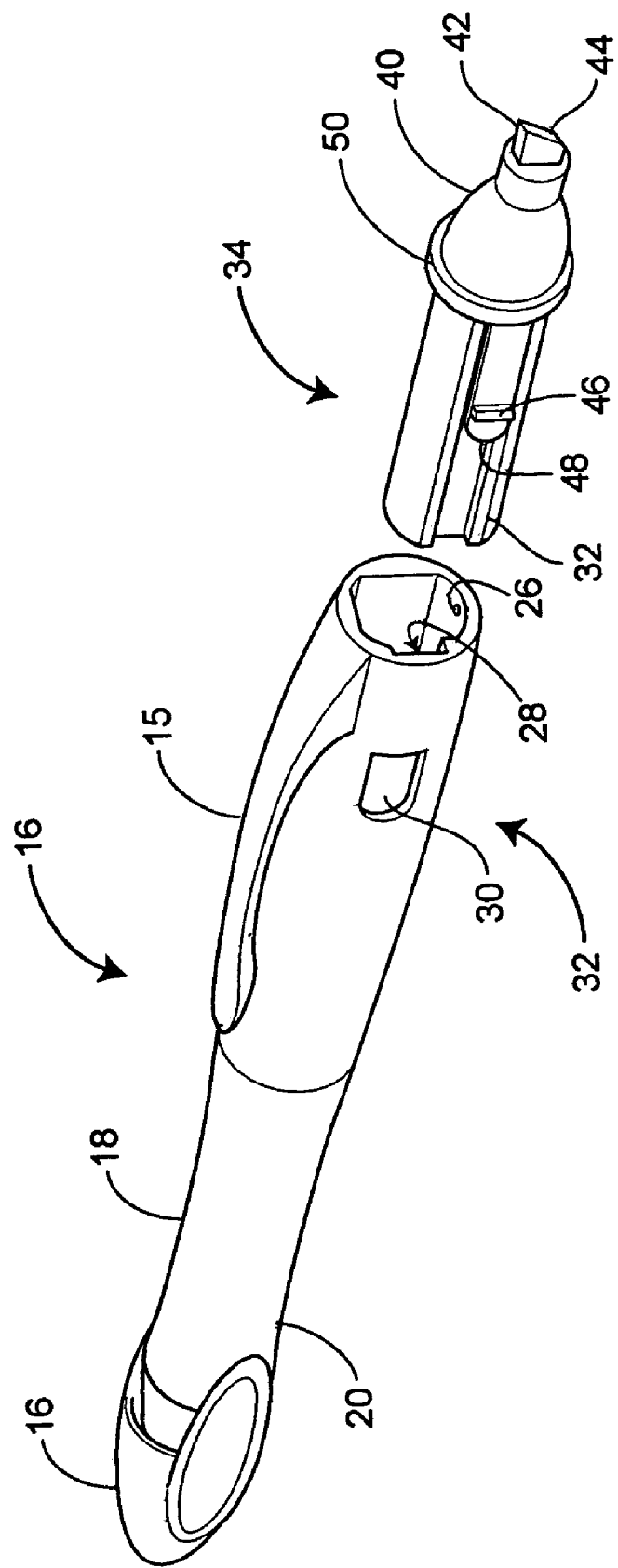
FIG. 2 illustrates an exploded perspective view of the combination pen of FIG. 1.

FIG. 2 illustrates a perspective view of the combination writing instrument 10 oriented with the second end 16 in the foreground. The body 12 and the second end 16 may be constructed to include a receptacle 24 having an opening 26 disposed distal to the first end 14 and the writing tip 17. The receptacle 24 and the body second end 16 can be formed to include an orientation means 28 that may be an alignment channel (as shown), an alignment groove, the geometry of the receptacle 24 itself, or any other physical alignment techniques. The receptacle 24 and the body second end 16 can further be formed to include a female portion 30 of a locking mechanism 32. The exemplary combination writing instrument 10 shows the female portion 30 of the locking mechanism 32 oriented approximately 90 degrees away from the clip 15. It will be understood that the female portion 30 can positioned virtually any orientation and aligned using the orientation means 28.

FIG. 2 further illustrates an auxiliary module 34 adapted to be received within the receptacle 24. The auxiliary module 34 includes a body 36 having a first end 38 and a second end 40 and defining a reservoir within the interior of the body 36. The second end 40 includes a dispensing tip 42 which may be, for the sake of example, a fiber tip marker point as indicated by the numeral 44. The fiber tip 44 can be manufactured to have a wedge/knife-edge shape such as the type used in the ACCENT™ highlighter or a blunted point depending on the fluid contained within the reservoir.

The auxiliary module 34 can further be formed with a male portion 46 of the locking mechanism 32. In operation, the auxiliary module can be axially aligned along the centerline CL such that the first end 38 is positioned adjacent to the opening 26 and the male portion 26 is rotationally aligned with the orientation means 28 and the female portion 30. Upon insertion of the auxiliary module 34 into the receptacle 24, a leading edge 48 of the male portion 48 engages the opening 26 and deflect inwards (towards the axial centerline CL). The auxiliary module 34 can be inserted into the receptacle until the male portion 46 engages the female portion 30 of the locking mechanism 32 to removably connect the two structures. Simultaneously, the first end 38 and a transition ring 50 may engage the receptacle base (not shown) and the opening 26, respectively.

The auxiliary module 34 can be removed, for replenishment or replacement, by depressing part of the male portion 46 in locking engagement with the female portion 30. In other words, the leading edge 48 of the male portion 46 can be flexed inward (toward the axial centerline CL) to allow the auxiliary module 34 to be removed from the receptacle 24.

Figure 3:
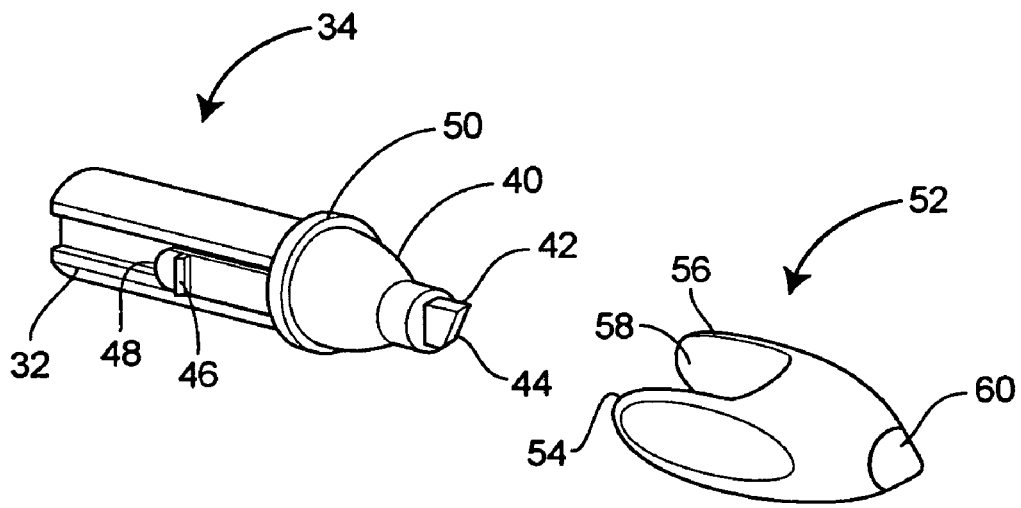
FIG. 3 illustrates a perspective view of an exemplary module cap.

FIG. 3 further illustrates a module cap 52 having a first and second retaining portions 54, 56 spaced apart to form a gap 58 sized to receive the second end 16. In operation, the module cap 52 can be aligned along the axial centerline CL and removeably secured to the second end 16 such that the first and second retaining portions 54, 56 engage the body 12 adjacent to the locking mechanism 32. Thus, the cap 52 and the first and second retaining portions 54, 56 cover and protect the male and female portions 46, 30 and prevent unintentional release of the auxiliary module 34 from the receptacle 24. Moreover, the module cap 52 may be affixed and removed from the second end 16 without releasing or otherwise loosening the auxiliary module 34. The module cap 52 may further include a stylus tip 60, positioned distal to the first and second retaining portions 54, 56, for entering data into a handheld computer such as a personal digital assistant.

Figure 4:
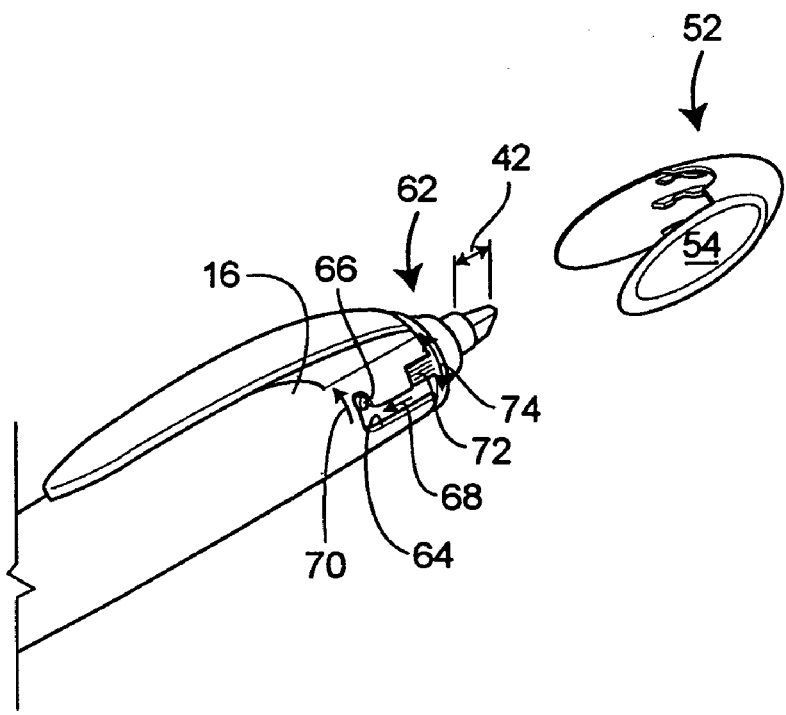
FIG. 4 illustrates an alternate embodiment of a locking mechanism shown in FIG. 1.

FIG. 4 illustrates an alternate embodiment of the locking mechanism 32 generally identified, for the sake of clarity, by the numeral 62. The locking mechanism 62 includes a roughly L-shaped receiving groove 64 formed into the body second end 16. The receiving groove has a first portion that extends along a line parallel to the axial centerline CL as indicated by the arrow 68 and a second portion that extends circumferentially around the body 12 as indicated by the arrow 70. The locking mechanism 62 further includes a locking post 66 integrally formed on an external surface of the auxiliary module 34. The locking post 66 may be sized to cooperate with the L-shaped receiving groove 64 such that a frictional force prevents the two from becoming separated.

In operation, the auxiliary module 34 can be linearly and rotationally aligned relative to the receptacle 24. In particular, the auxiliary module 34 may be linearly aligned along the axial centerline CL and the locking post 66 may be rotationally aligned relative to the L-shaped receiving groove 64. By fully inserting the locking post 66 into the L-shaped receiving groove 64 and twisting (in the direction indicated by the arrow 70) the entire auxiliary module 34 may be quickly and securely positioned within the body second end 16.

The auxiliary module 34 may further be formed with a ridged or gripping portion 72 to facilitate the twisting and seating of the auxiliary module within the L-shaped receiving groove 64. The gripping portion 72 may include an assembly aid such as the double-headed arrows 74 to indicate the lock (i.e. twist in the direction of arrow 70) and release (i.e. counter-twist in the direction opposite of arrow 70) directions. As was previously described in FIG. 3, the module cap 52 may be affixed to the second end 16 adjacent to the assembled locking mechanism 62 to protect the dispensing tip 42 and prevent unintentional release of the locking post 66 from the L-shaped receiving groove 64. Furthermore, the module cap 52 may be stored or affixed on the first end 14 adjacent to the writing tip 17 when the auxiliary module 34 is in primary use. This convenient storage arrangement prevents the module cap 52 from being lost or otherwise misplaced when it is removed from its storage or in-use position shown in FIG. 1.

Figure 5:
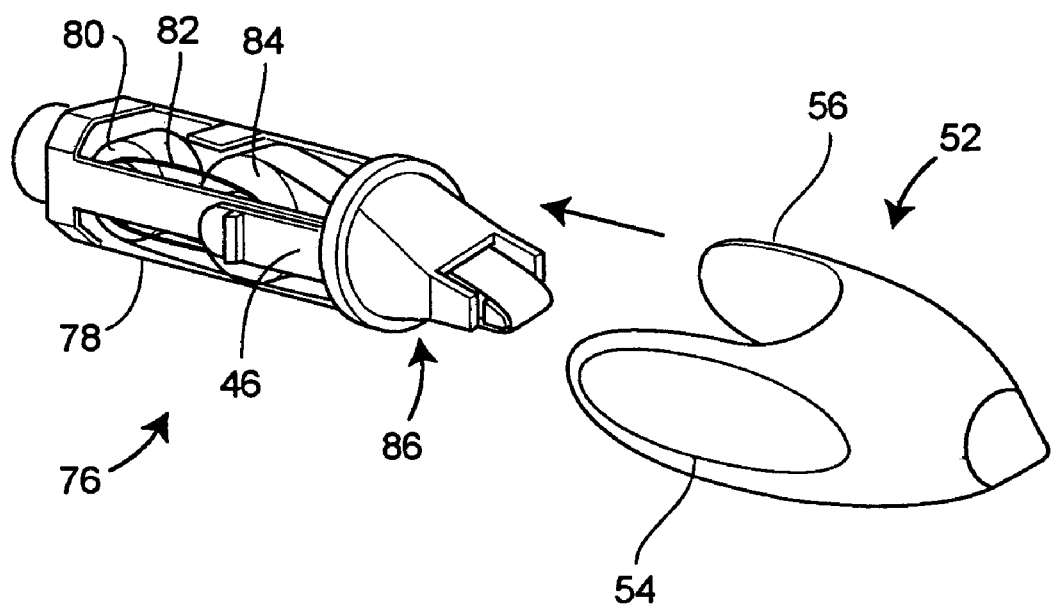
FIG. 5 illustrates an exploded perspective view of a tape dispensing auxiliary module.

FIG. 5 illustrates an alternate auxiliary module 34 configured as a transfer tape dispenser 76 that includes a substantially tubular body 78 adapted to be received within the receptacle 24. The transfer tape dispenser 76 further includes a tape reel 80 for storing and dispensing a wound ribbon of transfer tape 82. A take-up reel 84 cooperates with the tape reel 80 to insure that the ribbon of tape 82 is smoothly and continuously fed toward an applicator tip 86. In order to insure that the take-up reel 84 and the tape reel 80, which may be of different diameters depending on the amount of tape stored on the tape reel 80 at any given time, a differential belt 88 may rotationally connect the two. The differential belt 88 may be a limited slip differential that allows two components to rotate at different circumferential speeds while simultaneously insuring that they are synchronized. The applicator tip 86, in turn, can be positioned in contact with a writing surface to allow the ribbon of tape 82 to be dispensed over a desired area. It will be understood that any desired transfer tape or other strip material such as highlighter tape, decorative tape, adhesive tape and correction tape may be dispensed using this tape dispensing auxiliary module 76.

Figure 6:
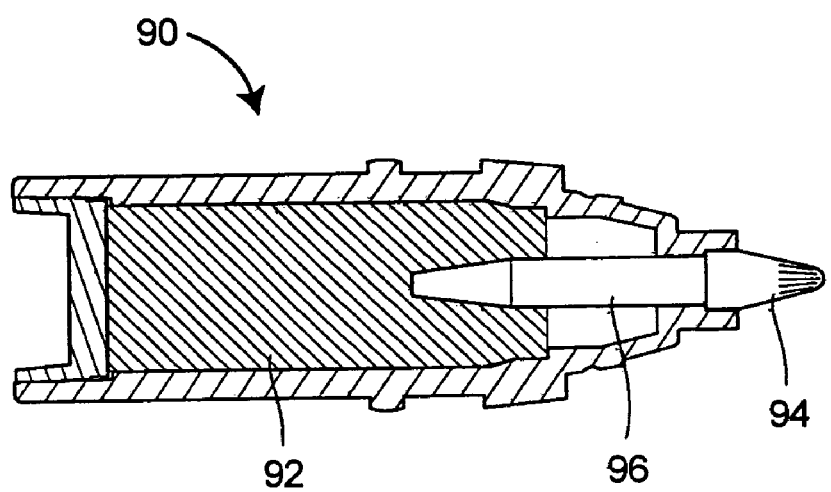
FIG. 6 illustrates a side elevation view in cross-section of an alternate auxiliary module including a fiber tip.
Figure 7:
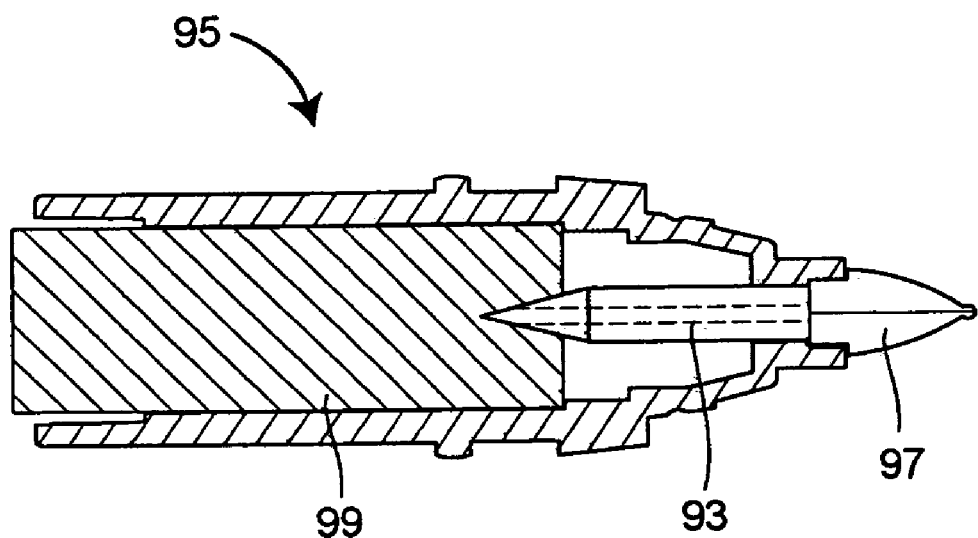
FIG. 7 illustrates an exploded perspective view of an alternate auxiliary module including a fountain pen nib.

FIG. 6 illustrates an alternate fiber tip auxiliary module 90 for dispensing fluids stored within a reservoir 92 defined by the interior of the auxiliary module 90. The fiber tip 94 extends external to the reservoir 92 and includes a wick 96 to insure continuous controlled fluid flow between the reservoir 92 and the fiber tip 94. An auxiliary module configured in this way can dispense a wide range of fluids such as, for example, those typically dispensed by a UNI® paint pen, a SHARPIE® permanent marker, and a SANFORD® security marker. It will be understood that the fiber tip 94 can be replaced with a roller ball tip (not shown) similar to the types used in known correction pens for dispensing other aqueous solutions such as, for example, LIQUID PAPER®. Moreover, a fountain pen auxiliary module 95 may be constructed by replacing the fiber tip 94 with a fountain pen nib 97, as shown in FIG. 7. The fountain pen auxiliary module 95 may be, in turn, supplied using refill ink or a preformed cartridge 99 and a supply channel 93.

Figure 8:
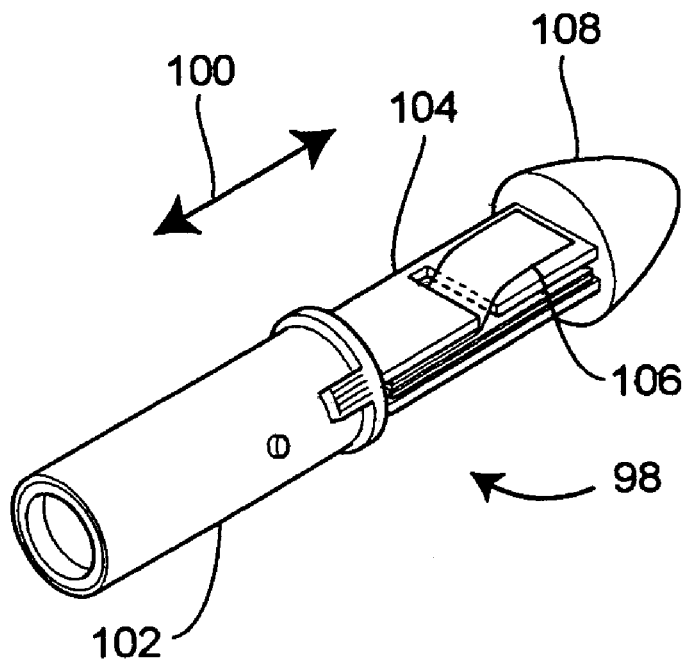
FIG. 8 illustrates a perspective view of a flag dispensing auxiliary module.

FIG. 8 illustrates a flag dispensing auxiliary unit 98 adapted to be received in the receptacle 24. The flag dispensing auxiliary unit 98 may be fixed in a single position, or may be shiftable, in the direction indicated by the arrow 100 between a concealed and a deployed position. The flag dispensing auxiliary unit 98 includes a body 102 cooperating with a flag guide 104 to contain and guide a plurality of flags 106. The flags may be, for example, prepackaged POST-IT® brand flags or any other suitable flag. In addition, the flag dispensing auxiliary unit 98 may include a cap 108 for aethestic reasons, or to provide a convenient grip location to facilitate shifting the flags between the concealed and deployed positions. Alternatively, the cap 108 may be rotatable around the axial centerline CL and include a window (not shown) that hides or reveals the tape flags depending on the relative orientation of the cap 108.

Although certain writing instruments, auxiliary modules and module caps have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A writing instrument comprising:
   a substantially tubular body including a first and second end;
   at least one writing tip associated with the first end;
   a receptacle integrally formed within the second end, the receptacle including a retaining portion;
   a self-contained removable auxiliary dispensing module including a securing portion, the self-contained removable auxiliary dispensing module adapted to be secured within the receptacle by the cooperation of the retaining portion and the securing portion; and
   an auxiliary module cap adapted to engage both the second end adjacent to the retaining and securing portions and the first end adjacent to the writing tip.

2. The writing instrument of claim 1, wherein the writing tip is retractably positioned within the first end and rotatable between a first extended position and a second stored position.

3. The writing instrument of claim 1, wherein the securing portion is a flexible projection extending from an external surface of the self-contained removable auxiliary dispensing module and engaging the complimentary retaining portion.

4. The writing instrument of claim 1, wherein the securing portion is a projection extending from an external surface of the self-contained removable auxiliary dispensing module and engaging an L-shaped track defining the retaining portion.

5. The writing instrument of claim 1, wherein the self-contained removable auxiliary dispensing module is a transfer tape dispensing module.

6. The writing instrument of claim 5, wherein correction tape dispensing module further comprises:
   a tape dispensing reel;
   a take-up reel; and
   a differential belt rotatably connected between the tape dispensing reel and the take-up reel.

7. The writing instrument of claim 1, wherein the self-contained removable auxiliary dispensing module is a fountain pen including a nib and an ink reservoir.

8. The writing instrument of claim 1, wherein the self-contained removable auxiliary dispensing module is a tape-flag dispenser.

9. The writing instrument of claim 1, wherein the self-contained removable auxiliary dispensing module is a fluid dispensing marker.

10. The writing instrument of claim 1, wherein the auxiliary module cap further includes a data entry tip.

11. A modular writing instrument comprising:
    a pen body including a first end;
        a writing tip positioned within the first end and rotatable between a first extended position and a second retracted position;
        a receptacle positioned within the pen body distal to the writing tip;
    a self-contained auxiliary dispensing module adapted to be removably received within the receptacle, the self-contained auxiliary dispensing module including a module body having an applicator tip and a locking means; and
    a module cap adapted to engage the pen body at a first position located adjacent to the locking means and at a second position located adjacent to the writing tip.

12. The modular writing instrument of claim 11, wherein the writing tip is an ink pen.

13. The modular writing instrument of claim 11, wherein the self-contained auxiliary dispensing module is a correction tape dispenser.

14. The modular writing instrument of claim 11, wherein the self-contained auxiliary dispensing module is a fluid dispensing device.

15. The modular writing instrument of claim 14, wherein the fluid dispensing device is a highlighter.

16. The modular writing instrument of claim 14, wherein the fluid dispensing device includes a fiber tip for dispensing fluid.

17. The modular writing instrument of claim 11, wherein the self-contained auxiliary dispensing module is a fountain pen.

18. A method of applying to a semi-flexible substrate a first material and a second material comprising;
    providing a writing instrument having a tubular body that includes a deployable writing tip for dispensing a first material at a first end of the tubular body;
    providing a receptacle at a second end of the tubular body;
    providing a removable self-contained auxiliary dispensing module including a locking mechanism adapted to removably secure the auxiliary module within the receptacle, the self-contained auxiliary dispensing module including a first end having a tip for applying the second material;
    securing a module cap to the first end of the self-contained auxiliary dispensing module and adjacent to the locking mechanism;
    placing the deployable writing tip in contact with the substrate to apply the first material to the substrate;
    removing the module cap from the self-contained auxiliary dispensing module first end;
    securing the module cap to the first end of the tubular body adjacent to the deployable writing tip; and
    placing the self-contained auxiliary dispensing module tip in contact with the substrate to apply the second material to the substrate.

19. The method of claim 18, wherein providing the removable self-contained auxiliary dispensing module includes providing a correction tape dispenser having a dispensing reel, a take-up reel and a band rotatably connected therebetween and wherein the second material comprises a correction tape material.

* * * * *